(12) United States Patent
Famolari (10) Patent No.: US 6,993,000 B2
(45) Date of Patent: Jan. 31, 2006

(54) METHOD FOR CDMA SOFT HANDOFF VIA IP MULTICASTING

(75) Inventor: David Famolari, Montclair, NJ (US)

(73) Assignee: Telcordia Technologies, Inc., Piscataway, NJ (US)

(*) Notice: Subject to any disclaimer, the term of this patent is extended or adjusted under 35 U.S.C. 154(b) by 798 days.

(21) Appl. No.: 09/884,727

(22) Filed: Jun. 19, 2001

(65) Prior Publication Data

US 2002/0196753 A1      Dec. 26, 2002

(51) Int. Cl.
*H04Q 7/00*     (2006.01)

(52) U.S. Cl. .................. 370/332; 370/474; 455/436; 455/442

(58) Field of Classification Search ........ 370/331–333, 370/335, 342, 474; 455/436–439, 442
See application file for complete search history.

(56) References Cited

U.S. PATENT DOCUMENTS

| | | | |
|---|---|---|---|
| 5,854,981 A * | 12/1998 | Wallstedt et al. ........... 455/439 |
| 6,230,013 B1 * | 5/2001 | Wallentin et al. ........... 455/436 |
| 6,252,861 B1 * | 6/2001 | Bernstein et al. ........... 370/331 |
| 6,252,862 B1 * | 6/2001 | Sauer et al. ................ 370/331 |
| 6,253,085 B1 * | 6/2001 | Bender ....................... 455/442 |
| 6,285,668 B1 * | 9/2001 | Kang ......................... 370/331 |
| 6,341,222 B1 * | 1/2002 | Neumiller et al. ....... 455/422.1 |
| 6,463,285 B1 * | 10/2002 | Davies et al. ............... 455/436 |
| 6,760,587 B2 * | 7/2004 | Holtzman et al. ......... 455/436 |
| 2001/0026541 A1 * | 10/2001 | You et al. ................... 370/331 |
| 2002/0093931 A1 * | 7/2002 | Dalal ......................... 370/342 |
| 2002/0167921 A1 * | 11/2002 | Vakil et al. ................. 370/331 |
| 2002/0191561 A1 * | 12/2002 | Chen et al. ................. 370/331 |

OTHER PUBLICATIONS

U.S. Appl. No. 09/775,864, filed Feb. 2, 2001, D. Famolari et al.
U.S. Appl. No. 09/883,569, filed Jun. 18, 2001, D. Famolari et al.

* cited by examiner

*Primary Examiner*—Ricky Ngo
*Assistant Examiner*—Nittaya Juntima
(74) *Attorney, Agent, or Firm*—Joseph Giordano; James W. Falk (57) ABSTRACT

Method for selecting IP data packet segments in an all-IP architecture that supports CDMA soft handoff via IP multicasting, wherein both the mobile terminal and IP backbone network receive a plurality of identical, redundant CDMA IP data packets. A best IP data packet is created by first, receiving a plurality of IP data packets from a plurality of corresponding base stations, second, separating those IP data packets into data packet segments comprising separate time intervals, and third, employing different metric standards to determine which of those data packet segments received for each time interval is the best data packet segment. The best data packet segments are determined by creating a quality matrix that represents the quality of each data packet segment for each time interval. A quality function is then computed for each time interval to determine which data segment is the best for that particular time interval.

10 Claims, 5 Drawing Sheets

METHOD FOR CDMA SOFT HANDOFF VIA IP MULTICASTING

FIELD OF THE INVENTION

The present invention generally relates to wireless Code Division Multiple Access (CDMA) Internet Protocol (IP) networks. More specifically, this invention relates to the soft handoff of mobile terminals in wireless CDMA IP networks.

BACKGROUND OF THE INVENTION

Modern wireless networks commonly employ CDMA techniques to communicate information between a mobile terminal and base station. Modulating information using CDMA techniques provides an advantage over other modulation methods because CDMA techniques enable multiple base stations to simultaneously use the same channel space to communicate information. Thus, CDMA techniques permit channel overlap between base stations, which has a number of significant advantages in wireless communication systems including the reduction of interference between mobile terminals and base stations, the exploitation of wireless network multipath components, and the simultaneous modulation and demodulation of information on multiple channels with multiple base stations.

Soft handoff is one method that uses these advantages to reduce data error and increase the quality of service for wireless CDMA networks. Soft handoff is a steady-state condition wherein a mobile terminal simultaneously communicates identical information with a plurality of base stations. Soft handoff increases transmission and reception diversity at the mobile terminal and mobile switching center of the wireless CDMA network, thereby increasing information capacity and quality of service while reducing the requisite signal to noise power ratio necessary to communicate information. Soft handoff typically exists throughout a mobile terminal's network connection; nonetheless, the plurality of base stations that communicate with the mobile terminal may change as the mobile terminal physically changes its location, thereby requiring the mobile terminal to switch the base stations with which it communicates.

In order to implement soft handoff within a wireless CDMA network, a mobile terminal and the plurality of base stations it communicates with must perform certain functions in order to maintain the plurality of mobile terminal-base station network connections. First, the mobile terminal must receive multiple base station transmissions on the forward link from the base station to the mobile terminal, and then combine these transmissions to aggregate the information sent by the plurality of base stations. This aggregation reduces the information error rate and increases the quality of service for the mobile terminal. Thus, the base stations must use identical CDMA symbols to modulate information and synchronize their transmissions to the mobile terminal on the forward link for the mobile terminal to accurately aggregate and demodulate the transmissions received from the base stations.

In addition, the plurality of base stations receives multiple mobile terminal transmissions on the reverse link from the mobile terminal to each base station. A mobile switching center aggregates or selects appropriate transmissions from the multiple transmissions received by the base stations in order to reduce the error rate and maintain a sufficient quality of service. Thus, the mobile terminal must also synchronously transmit information modulated with identical CDMA symbols to the plurality of base stations for the mobile switching center to aggregate or select CDMA information received from the mobile terminal.

Wireless CDMA voice networks are one common example of a wireless CDMA network that employs soft handoff. In a wireless CDMA voice network, a plurality of base stations is networked together through a common mobile switching center, which connects the base station network to the public phone network. The base stations communicate with mobile terminals using layer 2 Radio Link Protocol (RLP) frames, which include CDMA-modulated information communicated between the base stations and mobile terminals. For the forward link, the plurality of base stations synchronously transmits identical voice information that has been modulated using identical CDMA modulation symbols. This identical, synchronous, CDMA-modulated voice information is received by the mobile terminal, which aggregates the received information and modulation symbols to combine the information received and demodulate the voice information. Although the received information will vary in power, delay, and quality due to variances within the plurality of base station channels, aggregation enables the mobile terminal to recover the voice information and provide a greater quality of service.

For the reverse link, the mobile terminal modulates voice information using CDMA coding symbols and transmits the CDMA-modulated information to the plurality of base stations simultaneously. The base stations receive the CDMA-modulated information and forward the information to a mobile service center, which selects or aggregates the information received to maximize the quality of service and overcome transmission errors associated with information received at any single base station. The mobile service center then demodulates the CDMA-modulated information to recover the voice information transmitted by the mobile terminal.

A number of features about wireless CDMA voice networks make it relatively easy to implement soft handoff of mobile terminals. First, voice information requires a relatively small bandwidth, thereby permitting the mobile terminal and mobile switching center to employ simple combination and interpolation techniques to demodulate and recover voice information. Second, the CDMA-modulated voice information communicated between the plurality of base stations and the mobile terminal is identical, and thus the information received at both the mobile terminal and the mobile switching center can be combined and selected using relatively simple techniques.

In contrast, the features of wireless CDMA IP networks are markedly different from wireless CDMA voice networks, and make employment of simple aggregation, interpolation, and selection techniques virtually impossible. First, IP information can have a large and variable bandwidth that varies with the mobile terminal, IP application communicating information, and type of information being communicated. Second, wireless IP information communicated between each base station and mobile terminal is not identical because although the message content transmitted is identical, the IP header information for each message varies according to the IP subnet address of the base station communicating with the mobile terminal.

Modern wireless IP architectures use IP-based protocols to communicate messages in data packets between mobile terminals and base stations. In these architectures, IP base stations are connected to a wireless IP backbone network through edge routers, which interface the base stations with the backbone network. Each IP base station performs dual functions as both an RF front end for base station-mobile terminal communications and as a real-time router for IP data packets communicated between the mobile terminals and the wireless IP backbone network. The wireless IP backbone network further includes an IP-based control plan to route messages to and from the base station network that communicates with mobile terminals.

Variations of wireless IP architectures include architectures wherein each base station's coverage area defines an IP subnet. In these "all-IP" architectures, each base station has its own IP subnet address, and each base station and mobile terminal require layer 3 mobility management techniques to communicate messages between the base station and mobile terminal as the mobile terminal crosses a cell boundary. Thus, a mobile terminal may require an IP subnet address change when it crosses from one cell site to another using Mobile IP, DHCP, DRCP, or other layer 3 mobility management techniques.

One solution to the problems presented by soft handoff of mobile terminals in wireless "all-IP" CDMA networks is IP multicasting. Briefly, IP multicasting is a process wherein information is simultaneously communicated to a plurality of multicast group members. Each multicast group and its members are identified by an IP multicast address, which identifies the multicast group, and hence multicast group members, to which a multicast message should be communicated.

Soft handoff via IP multicasting occurs by creating an IP multicast address associated with a mobile terminal. Each mobile terminal-base station communication link is then assigned as a multicast group member to the mobile terminal's multicast group as identified by the mobile terminal's IP multicast address. Information is then communicated between the mobile terminal and its plurality of base stations used for soft handoff by broadcasting the information to the mobile terminal's multicast group. The information is thereby communicated via the plurality of mobile terminal-base station communication links simultaneously, thereby establishing soft handoff of the mobile terminal.

Although soft handoff of a mobile terminal via IP multicasting provides an elegant solution to providing soft handoff of a mobile terminal in wireless CDMA IP networks, it is difficult to combine or select a "best" CDMA IP data frame from the plurality of IP CDMA data frames received as part of the IP multicast process. In particular, the IP data packets communicated between the plurality of base stations and a mobile terminal in a soft handoff situation are not identical due to their different header information, which is attributable to the different IP subnet addresses for the base stations. Thus, the IP information communicated between the plurality of base stations and the mobile terminal cannot be aggregated according to prior art methods for voice data wherein the voice information communicated between each base station and mobile terminal is identical. As a result, there is a need for an efficient packet aggregation or selection mechanism that will create a "best" IP data packet from the plurality of redundant IP data packets received from different base stations despite their different header information.

In addition, this problem of packet aggregation and selection extends to all other methods of CDMA IP data frame communication independent of IP multicasting wherein a plurality of redundant IP data packets must be combined into a single "best" CDMA IP data packet to perform soft handoff of a mobile terminal. For these other methods, there remains a high demand for an efficient packet aggregation or selection mechanism that will create a "best" IP data packet from a plurality of redundant IP data packets communicated between a mobile terminal and a plurality of base stations.

SUMMARY OF THE INVENTION

These and other deficiencies and problems with IP data packet aggregation and selection for soft handoff of mobile terminals in wireless CDMA IP networks, both via IP multicasting and other methods, are addressed by the present invention, which is a method for selecting IP data packet segments in all-IP architectures that support CDMA soft handoff via IP multicasting. The present invention combines CDMA IP data frames and their corresponding IP data packets by determining which base station has transmitted the highest quality IP data packet segment for a particular measurement interval from the plurality of base stations that communicate CDMA IP data frames. By determining which base station has communicated the highest quality IP data packet segment for a plurality of measurement intervals, the present invention is able to assemble a "best" IP data packet that includes those specific IP data packet segments that are determined to be of the highest quality for their particular interval. Thus, the best IP data packet includes a plurality of IP data packet segments, each of which is the highest quality IP data packet segment for their specific interval.

The ability to construct a best IP data packet from individual redundant IP data packet segments depends on at least three basic variables. The first basic variable is the number of base stations included in soft handoff of the mobile terminal during a particular time interval, which thereby determines the number of redundant IP data packet segments per time interval. The different base stations participating in soft handoff for a particular time interval are indexed by the variable "k," with the total number of base stations referred to by the variable "b"; i.e., k ranges from 1 to b. Thus, if b=3, then three base stations participate in the soft handoff of a mobile terminal for a particular time interval, and thus the present invention has three IP data packets from which to select the highest quality segment for that time interval.

The second basic variable is the number of time segments used to construct a single IP data packet. The different time segments into which a IP data packet is divided are indexed by the variable "t," and the total number of time segments is referred to by the variable "j." Thus, if j=4, then each individual IP data packet is divided into four time segments. Furthermore, the number of bits in an IP data packet will be referred to by the variable "N." Thus, if N=128, then there are one-hundred-and-twenty-eight total bits in an IP data packet. Furthermore, there are (N/j) bits in each individual time segment. Thus, if N=128 and j=4, then there are (N/j=128/4)=32 bits in each individual time segment. In addition, for the example above where N=128 and j=4, thereby resulting in 32 bits per time interval, then t=1 refers to the first time segment with IP packet bits numbers 0–31, t=2 refers to the second time segment with IP packet bits numbers 32–63, t=3 refers to the third time segment with IP packet bits numbers 64–95, and t=4 refers to the fourth time segment with IP packet bits numbers 96–127.

The third basic variable is the number of quality metrics used to determine the quality of an IP data segment for a particular time segment. For instance, the quality of an IP data segment for a particular time segment may be determined using a plurality of metric standards including signal-to-interference ratio, frame error rate, received signal power, and a number of other relevant metric standards. The number of metric standards used to measure the quality of an IP data segment for a particular time segment is indexed by the variable "s," with the total number of metric standards referred to by the variable "m." Thus, if m=2, then two separate metrics, such as signal-to-interference ratio and frame error rate, are used to determine the quality of an IP data segment for a particular time segment. In addition, each specific metric corresponds to a particular metric variable for a particular time segment, and thus the "s-th" metric standard refers to one of the particular metric standards used to determine the quality of an IP data segment for a particular time segment. Thus, for the example above wherein signal-to-interference ratio and frame error rate are used to determine which CDMA IP data segment is best for a particular time interval, the signal-to-interference metric measurements may be represented by those metric measurement results for which s=1. Similarly, the frame error rate metric measurements may be represented by those metric measurement results for which s=2.

The present invention combines individual IP data packet segments received from the plurality of base stations into a single best IP data packet in the following fashion. First, the mobile terminal or mobile switching center receives a plurality of CDMA IP data frames, each of which includes a plurality of IP data packets. Those IP data packets received from different base stations should be identical because they include redundant data communicated over the mobile terminal-base station communication links to provide signal diversity. However, the IP data packets will actually have different quality levels depending on factors that affect the individual mobile terminal-base station communication links, including transmission characteristics, multipath components, interference, and other relevant factors. Thus, the mobile terminal or base stations receive a plurality of redundant IP data packets that should include identical information. The total number of base stations "b" that communicate these redundant IP data packets to and from the mobile terminal corresponds to the number of redundant IP data packets that are available as a source of redundant IP data segments.

Next, each IP data packet is divided into a plurality of IP data packet time intervals according to the particular value of "j." This subdivides each IP data packet into smaller time intervals from t=1 to t=j, each of which comprise N/j bits. As a result, the quality of each particular IP data packet interval from t=1 to t=j can be independently determined, thereby allowing construction of a "best" IP data packet that includes those IP data packet segments from each time interval that have the best quality.

After subdivision of each IP data packet into j time intervals each comprising N/j bits, the quality of each IP data segment for each time interval for each quality metric is determined in order to determine the overall quality of each IP data segment. Thus, where "k" represents the particular base station that is the source of the IP data packet, "t" represents the particular time interval, or equivalently the IP data segment, for the IP data packet. In addition, "s" represents the particular metric standard applied to determine the quality of the IP data segment. The quality for each IP data packet is thereby determined for {k: k=1 . . . b, t: t=1 . . . j, s: s=1 . . . m}. The total number of quality calculations is "b*j*m," which equals the number of base stations or redundant IP data packets multiplied by the number of time intervals for each IP data packet multiplied by the number of quality metrics used to determine the IP packet segment quality.

The actual quality calculation occurs via a quality matrix Q, which determines the quality of an IP data segment for each individual quality metric. Alternatively, the quality of each base station's IP data packet is represented by a quality metric $M_k$, wherein M is the quality metric of an IP data packet for a particular base station k as determined for each applicable metric standard and each time interval. Thus, the quality metric for an IP data packet for a particular base station "k" is determined by a quality metric matrix $M_k^{(s,t)}$ wherein "k" is the particular base station, "s" is the particular metric standard, and "t" is the particular time interval. There are "b" total quality metric matrices $M_k^{(s,t)}$, each of which is a "m by j" matrix that includes the quality matrix measurements for each quality metric and IP data segment for a particular base station.

Each IP packet in turn can be divided into the IP header, which includes the information about the IP packet source and destination, and the IP payload, which includes the actual IP packet data. Thus, each IP data packet $P_k$ can be separated into its IP header and IP payload, referred to by the matrices $P_k^H$ and $P_k^D$, respectively. The main concern for determining the quality of the IP data packet segments is the IP payload, and thus the present invention focuses on determining the high quality IP payload data segments in order to construct a "best" IP data packet.

In order to determine the quality matrix Q for a plurality of base stations and time intervals, it is assumed that only one quality metric is recorded and thereby used to determine the quality of different IP data packets. In this instance, the total metric standard variable m=1, and therefore each quality metric matrix $M_k^{(s,t)}$ becomes a quality metric vector $M_k^{(t)}$ having j elements. In addition, the bit mapping vector T(t) is also a vector having j elements that includes the bit position of the right most bit associated with interval t. Each quality metric vector $M_k^{(t)}$ for an IP data packet $P_k$ is used to construct a quality matrix Q for a set of redundant IP data packets. In particular, the quality matrix Q is formed in the following fashion:

$$Q = \begin{bmatrix} M_1^1 & \cdots & M_1^j \\ \vdots & \ddots & \vdots \\ M_k^1 & \cdots & M_k^j \end{bmatrix}$$

This quality matrix Q and the bit mapping vector T(t) are used to determine which IP packet segment for each time interval is of the highest quality and should therefore be included in the "best" IP data packet. As mentioned, packet segment quality is determined for the IP packet payload, which is represented by $P_k^D$. The quality matrix Q can be renormalized based on the bit position of the IP packet payload in order to construct a payload quality matrix $Q^D$, which includes only those IP metric measurements for the IP data packet payload. In order to renormalize the quality matrix Q into the IP packet payload quality matrix $Q^D$, the original quality matrix Q is partitioned according to the bit position $N_D$ at which the payload begins. For instance if the payload begins at bit position 320 such that $N_D$=320, then the max index $s^D$ is determined for the mapping vector T(t), where T(t)≦$N_D$, and thus T(t)≦320. All columns up to the mapping index $s^D$ are then eliminated from the quality matrix Q in order to create the payload quality matrix $Q^D$, which includes those quality metric measurements pertaining only to the data portions, as opposed to the header portions, of the IP packets:

$$Q^D = \begin{bmatrix} M_1^{s^D} & \cdots & M_1^j \\ \vdots & \ddots & \vdots \\ M_k^{s^D} & \cdots & M_k^j \end{bmatrix}$$

The payload quality matrix $Q^D$ is then used to determine which base station communicated the highest quality data packet segment during each measurement interval. This occurs when base station quality function $F(M_k^n)$, which determines which base station produced the highest quality segment for the measurement interval "n," is computed from the payload quality matrix $Q^D$. A "best" IP data packet P* is then created, and includes the highest quality packet segments for each measurement interval n. An IP header field with an appropriate destination address is added to complete the "best" IP data packet, which is then sent to its appropriate destination.

As described above, it is advantageous to separate the header field from the data field of the IP packet. This involves the partitioning of the Q matrix, as described, and allows for quicker processing. However, such separation is not essential to attain the method of combining and selecting a best packet, in accordance with my invention.

BRIEF DESCRIPTION OF THE DRAWINGS

The foregoing and other features of the present invention will be more readily apparent from the following detailed description and drawings of illustrative embodiments of the invention in which.

DETAILED DESCRIPTION OF THE PREFERRED EMBODIMENTS

Figure 1:
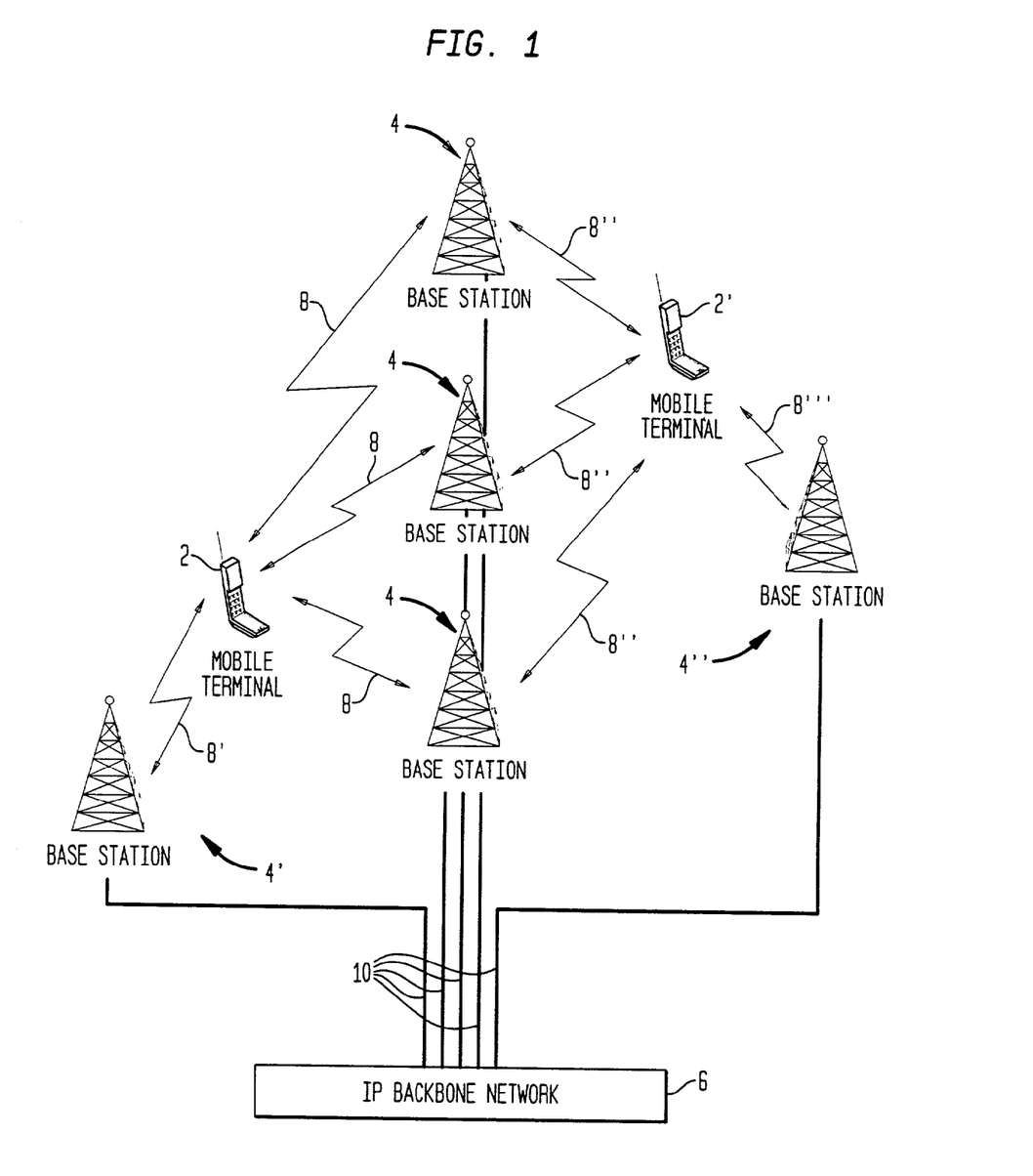
FIG. 1 is a diagram of a CDMA IP multicasting soft handoff system in which this invention may be employed.

Referring now to FIG. 1, therein is shown a diagram of a CDMA IP multicasting soft handoff system. A plurality of mobile terminals 2 and 2' are in a steady-state soft handoff condition with a plurality of base stations 4, 4' and 4" via their multicast network connections 8, 8', 8" and 8'". The base stations 4, 4' and 4" are connected to the IP backbone network 6 via IP backbone network connections 10.

Each mobile terminal 2 and 2' is in soft handoff via multicast network connections with certain base stations. The three base stations 4 communicate with mobile terminal 2 via the three separate multicast network connections 8 between the base stations 4 and mobile terminal 2. The three base stations 4 also communicate with mobile terminal 2' via the three separate multicast network connections 8" between the base stations 4 and mobile terminal 2'. In addition, base station 4' communicates with mobile terminal 2 via the multicast network connection 8', and base station 4" communicates with mobile terminal 2' via the multicast network connection 8'". Thus, mobile terminal 2 is in soft handoff with the four base stations 4 and 4' via its four multicast network connections 8 and 8'. Similarly, mobile terminal 2' is in soft handoff with the four base stations 4 and 4" via its four multicast network connections 8" and 8'". Communications between the mobile terminals 2 and 2' and the IP backbone network 6 take place via IP backbone network connections 10 between the wireless IP backbone network 6 and the base stations 4, 4' and 4".

Whenever the IP backbone network 6 sends information to the mobile terminals 2 and 2', the IP backbone network 6 broadcasts the information as a multicast message to the multicast group associated with mobile terminals 2 and 2', respectively. For instance, when the IP backbone network 6 sends information to mobile terminal 2, it broadcasts a multicast message to the multicast group of mobile terminal 2. Four multicast participants and multicast IP network interfaces are associated with mobile terminal 2 because it has four multicast network connections 8 and 8' corresponding to the four base stations 4 and 4'. Thus, four identical multicast messages are broadcast by the IP backbone network 6, sent to the four base stations 4 and 4', and transmitted to the mobile terminal 2 via the four multicast network connections 8 and 8'.

The mobile terminal 2 receives the four multicast messages via its four multicast IP network interfaces that correspond to the four multicast network connections 8 and 8'. Each multicast IP network interface corresponds to a multicast participant that resides at the mobile terminal 2. Thus, the mobile terminal 2 has four multicast participants that correspond to its four multicast network connections 8 and 8', and act as four independent multicast IP network interfaces that receive the four multicast messages from the four base stations 4 and 4'. The information content for each of these four multicast messages should be identical, because the same multicast message has been sent to the four multicast participants that reside at the mobile terminal 2. Soft handoff is thereby achieved on the forward link, because the mobile terminal 2 receives identical information from the IP backbone network 6 simultaneously via the four base stations 4 and 4', and their corresponding multicast network connections 8 and 8'.

For the mobile terminal 2 to transmit information to the IP backbone network 6, it responds to the multicast message sender simultaneously via its four participants. Thus, the mobile terminal 2 sends the same message via its four participants and multicast IP network interfaces over the four corresponding multicast network connections 8 and 8' to the four base stations 4 and 4'. These base stations 4 and 4' receive identical information from the mobile terminal 2 and send this information to the IP backbone network 6 via the IP backbone network connections 10. The IP backbone network 6 receives the four multicast messages with identical information from the four base stations 4 and 4', thereby establishing soft handoff on the reverse link.

Both mobile terminals 2 and 2' and the IP backbone network 6 receive a plurality of identical information along the forward and reverse links 8, 8', 8" and 8'" from the mobile terminals 2 and 2' to the wireless IP backbone network 6. The mobile terminals 2 and 2', and IP backbone network 6, must then create a "best" IP data packet from the plurality of identical IP data packets received over the plurality of forward and reverse links 8, 8', 8" and 8'" from the plurality of base stations 4, 4' and 4". The present invention enables both the mobile terminals 2 and 2', and the IP backbone network 6 to create such a best IP data packet via the IP packet segment selection process described herein.

For instance, mobile terminal 2 will receive four redundant IP data packets from base stations 4 and 4' via their multicast network connections 8 and 8', respectively. The mobile terminal may then separate each base station's received IP data packet into a plurality of time intervals and determine which received IP packet data segment for each time interval is the best quality via a plurality of quality metric standards. Thus, mobile terminal 2 is able to assemble a best IP data packet from the plurality of received IP data packets that includes the best IP packet data segment for each time interval.

This process also occurs at a mobile switching center within the IP backbone network 10. The IP backbone network 10 receives a plurality of redundant IP data packets from the mobile terminal 2 via its multicast network connections 8 and 8'. A mobile switching center within the IP backbone network 10 receives these redundant IP data packets, separates the received IP data packets into separate IP data packet segments corresponding to separate time intervals, and determines which of the received IP data packet segments is the highest quality for each time interval by using different quality metrics. The mobile switching center is then able to construct a best IP data packet that includes the best IP data segment for each time interval from those received IP data packets.

It should be understood that although FIG. 1 illustrates a system that employs soft handoff of a mobile terminal in wireless CDMA IP systems using IP multicasting, the IP data segment selection method and apparatus of the present invention is equally applicable to any other system that performs soft handoff of a mobile terminal within a wireless CDMA IP network regardless of whether IP multicasting is the particular method employed for soft handoff. For instance, referring to FIG. 1, soft handoff of mobile terminal 2 can be performed by any other method or process wherein the mobile terminal 2 and IP backbone network 6 are in soft handoff, thereby communicating a plurality of redundant, identical IP data packets via the mobile terminal-base station communication links 8 and 8' and their corresponding base stations 4 and 4', respectively. Thus, so long as the mobile terminal 2 and IP backbone network 6 receive a plurality of identical redundant IP data packets, the present invention may be used to create a "best" IP data packet from those redundant IP data packets received.

In accordance with aspects of my invention, a particular frame of information is transmitted by each of a plurality of base stations 4 over the mobile terminal-base station communications links 8 to a particular mobile terminal 2. This particular information frame in accordance with my invention is referred to herein as a Base Station Quality Metric (BSQM) IP Frame. The mobile terminal 2 receiving these multiple Base Station Quality Metric IP frames from different base stations then evaluates the data segments contained therein, according to predetermined criteria or metrics, and selects the best data from among the multiple transmitted BSQM IP Frames. In the illustrative embodiment described herein, the determination of the best data segments is made in the mobile terminal 4 for forward link transmissions, as described above; for transmission in a reverse link, the decision process may be carried out in a base station 4.

Figure 2:
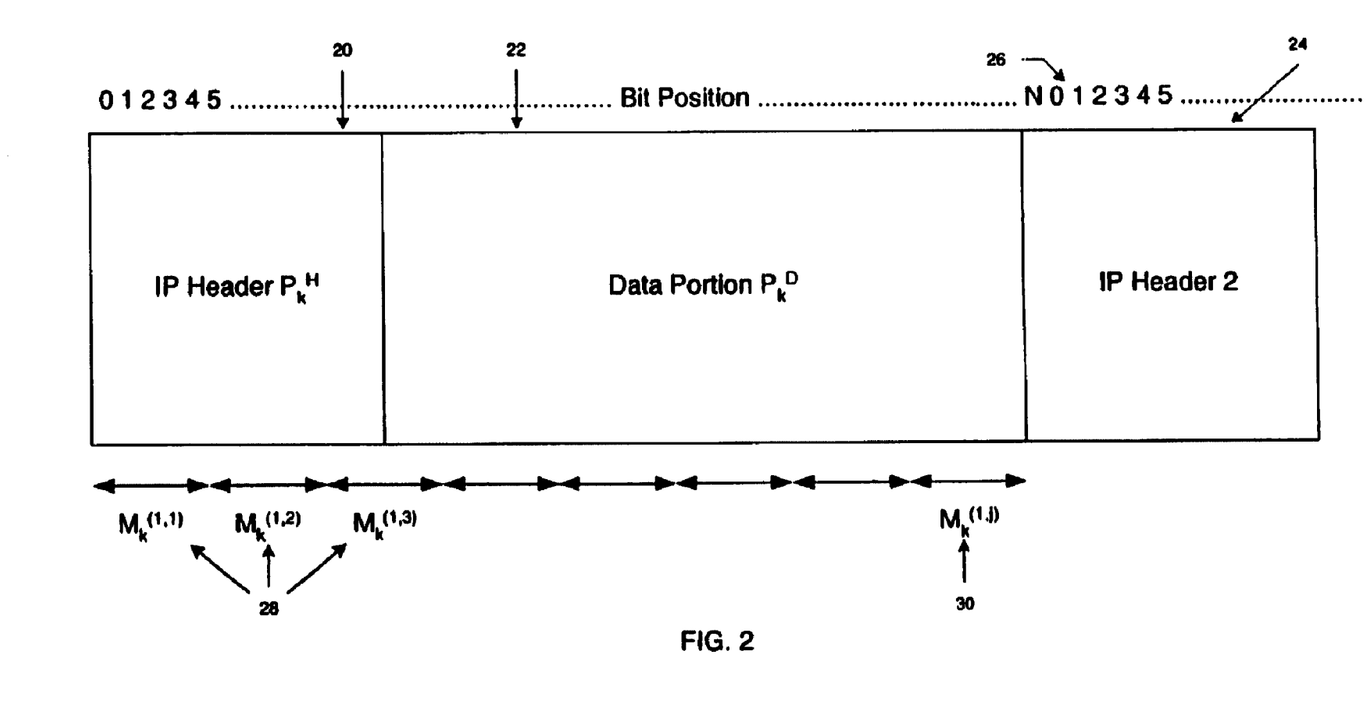
FIG. 2 depicts an exemplary frame of the information transmitted by a base station in accordance with one illustrative embodiment of my invention.

As seen in FIG. 2, the Base Station Quality Metric IP Frame is an IP data frame that includes a plurality of IP data packets. Each IP data packet is in turn divided into "j" time intervals. Each time interval includes an IP data segment which may be compared with other redundant IP data segments from different base stations. The present invention creates a best IP data packet that includes those best IP data segments for each time interval according to the different quality metric standards.

Referring now to FIG. 2, each IP data packet includes an IP header portion 20 and IP data portion 22, and the IP data frame includes N total bits 26. The IP data frame is separated into individual time intervals or IP data segments 28, with a total of "j" time intervals of IP data segments per IP data frame. Thus, the final IP data segment for each IP data frame is the "j-th" IP data segment 30, which comprises the final IP data segment before the next IP data frame 24.

The subscript "k" for the IP data packet and its individual IP data segments 26 refers to the fact that each IP data frame is associated with a particular base station "k," which is one of the total base stations "b." Similarly, each IP data segment 26 has its own individual quality metric value $M_k^{(s,t)}$, wherein "k" is the base station for the particular IP data frame, "s" is the particular quality metric standard being used to evaluate the IP data frame, and "t" is the particular data segment being evaluated. Thus, for the data segment shown, s=1 because the first quality metric standard is being used to evaluate the individual data segments, t=1 . . . j because there are "j" total data segments for the IP data frame, and k can be any value from 1 . . . b, where "b" is the total number of base stations or redundant IP data frames received and evaluated to determine which redundant IP data segment is the best. Each base station's IP data segment (k,t) has an associated quality metric value for each quality metric standard "s" used to evaluate the IP data segment.

Figure 3:
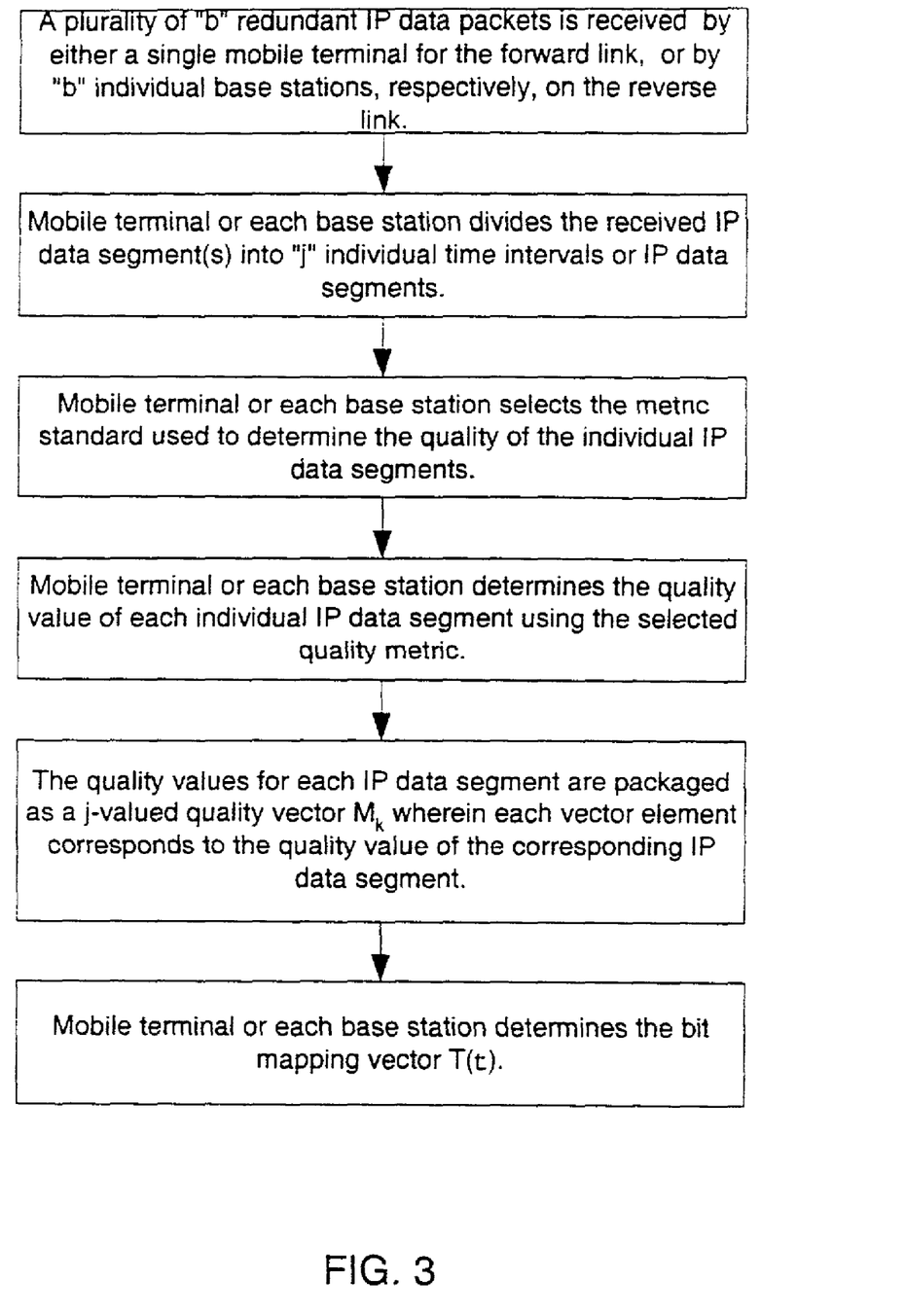
FIG. 3 is a flowchart of the quality metric vector extraction process.

FIG. 3 shows a flowchart of the quality metric vector extraction process, wherein the plurality of quality metric vectors $M_k$ and the bit mapping vector T(t) are created prior to creating a quality metric matrix Q. A quality metric vector is a vector having j elements for a particular base station or IP data packet determined by a particular quality metric standard. A bit mapping vector T(t) is a bit vector used to renormalize a quality matrix Q into a payload quality matrix $Q^D$.

Referring now to FIG. 3, a plurality of "b" redundant IP data packets are first received either at a single mobile terminal or "b" individual base stations, respectively (step 40). For the forward link from the base station to the mobile terminal, the mobile terminal itself will receive all "b" redundant IP data packets, because it is the destination of every IP data packet on the forward link in soft handoff. For the reverse link from the mobile terminal to the base station, each base station will receive a single redundant IP data packet because each base station is the destination of only one IP data packet on the reverse link in soft handoff. The mobile terminal or each base station then divides the received IP data packet(s) into "j" separate time intervals or IP data segments (step 42). This thereby establishes the granularity of the IP data segments used to create the "best" IP data packet from the plurality of received IP data packets.

After dividing the received IP data packet(s) into individual time intervals or IP data segments, the mobile terminal or each base station then selects the appropriate metric standard used to determine the quality of the individual data segments for each IP data packet (step 44), the appropriate metric being selected dependent on the particular system function to be optimized. The mobile terminal or each base station then determines the quality values of each individual data segment using the selected quality metric (step 46). The mobile terminal or each base station packages these quality values as a quality vector $M_k$ having j elements wherein each element of the vector corresponds to the quality value of the corresponding data segment (step 48).

In addition, the mobile terminal or base station also creates the bit mapping vector T(t), which is a vector having j elements that includes the bit position of the right-most bit associated with interval t (step 50).

Figure 4:
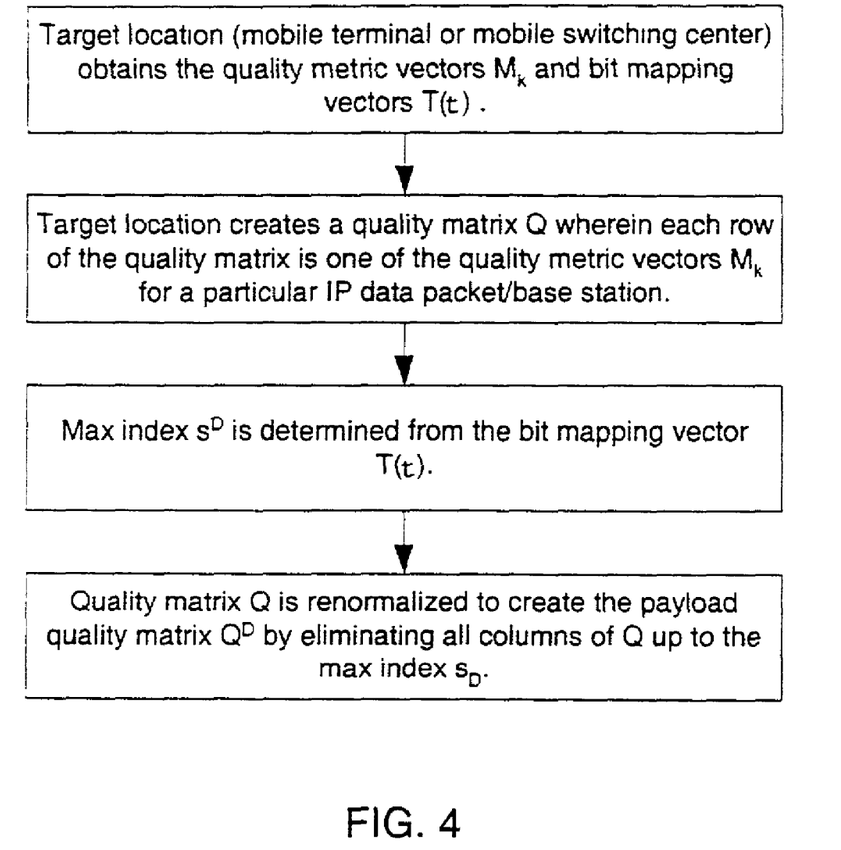
FIG. 4 is a flowchart of the payload quality matrix creation process.

FIG. 4 shows a flowchart of the payload quality matrix creation process, wherein a single quality metric matrix Q is created and then normalized to create a payload quality matrix $Q^D$ for a particular quality metric. The quality metric matrix Q is a matrix that includes quality metric values for the plurality of redundant IP data segments for the individual time intervals. Thus, each quality metric matrix is valid only for one particular quality metric standard, and a plurality of quality metric matrices must be constructed for a plurality of quality metric standards.

For the forward link, the quality matrix Q is created at the mobile terminal, which has already determined the quality vector $M_k$ and bit mapping vector T(t) for each IP data packet received. For the reverse link, the quality matrix Q is created at a mobile switching center in the IP backbone network, which receives the quality vector $M_k$ and bit mapping vector T(t) for each IP data packet from the corresponding base station where it is received, respectively. The payload quality matrix $Q^D$ is then determined by normalizing the quality matrix Q using the bit mapping vector T(t) for the IP data packets.

Referring now to FIG. 4, the target location, which is either the mobile terminal or mobile switching center depending on whether the IP data packets are communicated on the forward link or reverse link, respectively, first obtains the quality metric vectors $M_k$ and bit mapping vectors T(t) for the redundant IP data packets (step 60). The target location then creates a quality matrix Q, wherein each row of the quality matrix is one of the quality metric vectors $M_k$ for a particular IP data packet communicated by a particular base station (step 62). Thus, the quality matrix Q is formed in the following fashion:

$$Q = \begin{bmatrix} M_1^1 & \cdots & M_1^j \\ \vdots & \ddots & \vdots \\ M_k^1 & \cdots & M_k^j \end{bmatrix}$$

Once the quality matrix Q has been determined, the payload quality matrix $Q^D$ is determined by renormalizing the quality matrix. The max index $s^D$ is first determined from the bit mapping vector T(t) (step 64). The quality matrix Q is then renormalized by eliminating all columns of the quality matrix Q up to the value of the max index $s^D$ (step 66). The resulting payload quality matrix $Q^D$ is the original quality matrix Q without those IP data segment quality values $M_k$ for $t \leq s^D$. Thus, the payload quality matrix $Q^D$ is formed in the following fashion:

$$Q^D = \begin{bmatrix} M_1^{s^D} & \cdots & M_1^j \\ \vdots & \ddots & \vdots \\ M_k^{s^D} & \cdots & M_k^j \end{bmatrix}$$

Figure 5:
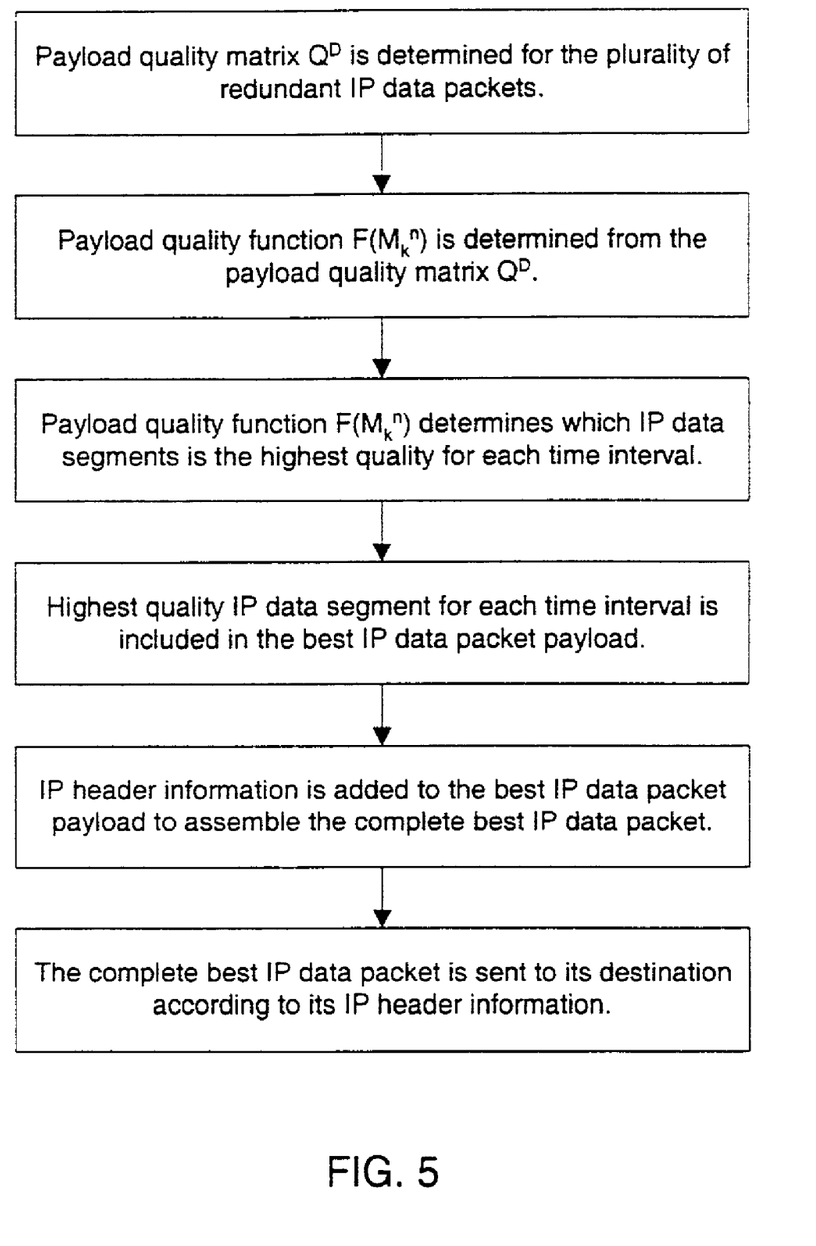
FIG. 5 is a flowchart of the IP payload segment selection process.

FIG. 5 shows a flowchart of the IP payload segment selection process, wherein a "best" IP data packet is created by selecting the highest quality received IP data segments for each time interval. The best IP data segment is determined from the payload quality matrix $Q^D$ by deriving a payload quality function $F(M_k^n)$, which determines which of the received IP data packet segments is the highest quality for each time interval.

Referring now to FIG. 5, the payload quality matrix $Q^D$ for the plurality of redundant IP data packets is first determined (step 70). The payload quality function $F(M_k^n)$ is then determined from the payload quality matrix $Q^D$ (step 72). The payload quality function $F(M_k^n)$ determines which IP data segment from the plurality of IP data segments for each time interval has the highest quality, and should thereby be included in the best IP data packet.

After determining the payload quality function $F(M_k^n)$, the payload quality function then determines which IP data segment from each time interval is of the highest quality and should thereby be included in the best IP data packet for that particular time interval (step 74). These best IP data segments, which comprise the best IP data segment for each time interval, are then included in the best IP data packet payload (step 76). The IP header information for the best IP data packet payload is then added, thereby assembling the completed best IP data packet (step 78). This best IP data packet is then sent to its destination according to the best IP data packet header information (step 80).

While the invention has been particularly shown and described with reference to preferred embodiments thereof, it will be understood by those skilled in the art that various changes in form and details may be made therein without departing from the spirit and scope of the invention.

What I claim is:

1. A method for supporting CDMA soft handoff of data packets between base stations and mobile terminals in an IP network, said method comprising the steps of:
   transmitting a plurality of redundant data packets to a mobile terminal or to a base station,
   at the mobile terminal or at a mobile switching center in the IP network dividing received data packets into individual IP data segments,
   selecting quality metric standards to determine the quality of the data segments,
   determining the quality value of individual data segments using the selected metric standards,
   packaging the quality values with the corresponding data segments, said packaging step comprising packaging the quality values as a quality vector having elements each corresponding to the quality value of its corresponding data segment, and
   assembling a best IP data packet payload in accordance with the highest quality IP data segments for each time interval.

2. The method in accordance with claim 1 wherein said transmitting step transmits the plurality of redundant data packets to multiple base stations.

3. The method in accordance with claim 1 further comprising creating a payload quality matrix for each quality metric standard.

4. The method in accordance with claim 3 wherein said step of creating quality metric matrix is performed at a mobile terminal for a forward link from a base station to the mobile terminal.

5. The method in accordance with claim 3 wherein said step of creating quality metric matrix is performed at the mobile switching center in the IP network for a reverse link call from the mobile terminal to one or more base stations.

6. The method in accordance with claim 3 wherein each row of the quality matrix is one of the quality metric vectors for a particular IP data packet.

7. The method in accordance with claim 1 wherein said step of assembling the best IP data packet payload is determined from the quality matrix by deriving a payload quality function which determines which of the received individual data packet segments has the highest quality for each time interval.

8. The method in accordance with claim 7 further comprising the step of adding IP header information to the assembled best IP data packet payload.

9. The method of claim 1 wherein said step of transmitting comprises multicasting the redundant data packages from a plurality of base stations to a mobile terminal.

10. The method in accordance with claim 1 wherein the transmitted redundant data packages include a header field and further comprising the step of separating the header filed from the data packages prior to the step of dividing the received data packets into the individual data segments.

* * * * *

UNITED STATES PATENT AND TRADEMARK OFFICE
CERTIFICATE OF CORRECTION

| | | |
|---|---|---|
| PATENT NO. | : 6,993,000 B2 | Page 1 of 1 |
| APPLICATION NO. | : 09/884727 | |
| DATED | : January 31, 2006 | |
| INVENTOR(S) | : Famolari | |

It is certified that error appears in the above-identified patent and that said Letters Patent is hereby corrected as shown below:

In the Specification

In Column 3, Line 44, delete "IP CDMA" and insert -- CDMA IP --, therefor.

In Column 9, Line 59, delete "mobile terminal 4" and insert -- mobile terminal 2 --, therefor.

In the Claims

In Column 14, Line 9, in Claim 10, delete "header filed" and insert -- header field --, therefor.

Signed and Sealed this
Twenty-fifth Day of November, 2014

Michelle K. Lee
*Deputy Director of the United States Patent and Trademark Office*